United States Patent [19]

Yamagata et al.

[11] Patent Number: 5,062,009
[45] Date of Patent: Oct. 29, 1991

[54] RECORDING AND/OR REPRODUCING APPARATUS HAVING, IN ADDITION TO A RECORDING MEDIUM, MEMORY MEANS FOR MEMORIZING INFORMATION REPRODUCED FROM THE RECORDING MEDIUM

[75] Inventors: Shigeo Yamagata, Kanagawa; Tuguhide Sakata, Tokyo; Tomishige Taguchi, Saitama; Somei Kawasaki, Tokyo, all of Japan

[73] Assignee: Canon Kabushiki Kaisha, Tokyo, Japan

[21] Appl. No.: 494,816

[22] Filed: Mar. 15, 1990

Related U.S. Application Data

[63] Continuation of Ser. No. 309,948, Feb. 9, 1989, abandoned, which is a continuation of Ser. No. 840,886, Mar. 18, 1986, abandoned.

[30] Foreign Application Priority Data

Mar. 19, 1985 [JP] Japan .................................. 60-053260

[51] Int. Cl.$^5$ .............................................. H04N 5/78
[52] U.S. Cl. .................................. 360/33.1; 360/35.1; 360/66; 358/342
[58] Field of Search ........................ 360/27, 33.1, 38.1, 360/35.1, 10.1, 66, 57; 358/342; 369/111, 122

[56] References Cited

U.S. PATENT DOCUMENTS

| | | | |
|---|---|---|---|
| 3,824,620 | 7/1974 | Länger | 360/38.1 |
| 4,058,840 | 11/1977 | Kasprzak | 360/10.1 |
| 4,286,294 | 8/1981 | Nakauchi et al. | 360/27 |
| 4,290,087 | 9/1981 | Bixby et al. | 360/35.1 X |
| 4,472,748 | 9/1984 | Kato et al. | 369/111 X |
| 4,476,499 | 10/1984 | Kanamaru et al. | 360/27 X |
| 4,506,304 | 3/1985 | Harvey | 358/342 X |
| 4,509,156 | 4/1985 | Ohara et al. | 369/111 X |
| 4,545,044 | 10/1985 | Satoh et al. | 369/111 X |
| 4,566,088 | 1/1986 | Yoshida et al. | 369/122 X |
| 4,571,643 | 2/1986 | Namiki | 360/66 |
| 4,602,296 | 7/1986 | Murakoshi | 360/66 X |
| 4,714,969 | 12/1987 | Bischoff et al. | 360/66 |

FOREIGN PATENT DOCUMENTS

| | | | |
|---|---|---|---|
| 58-121103 | 7/1983 | Japan | 360/57 |
| 58-125203 | 7/1983 | Japan | 360/57 |
| 61-13404 | 1/1986 | Japan | 360/66 |

Primary Examiner—Aristotelis Psitos
Assistant Examiner—Andrew L. Sniezek
Attorney, Agent, or Firm—Toren, McGeady & Associates

[57] ABSTRACT

A recording and/or reproduction apparatus having a control circuit so that when it is desired to reproduce information recorded in tracks on a recording medium, after such a reproducing operation has been stably performed, the information recorded in the track is caused to be memorized in a memory.

9 Claims, 5 Drawing Sheets

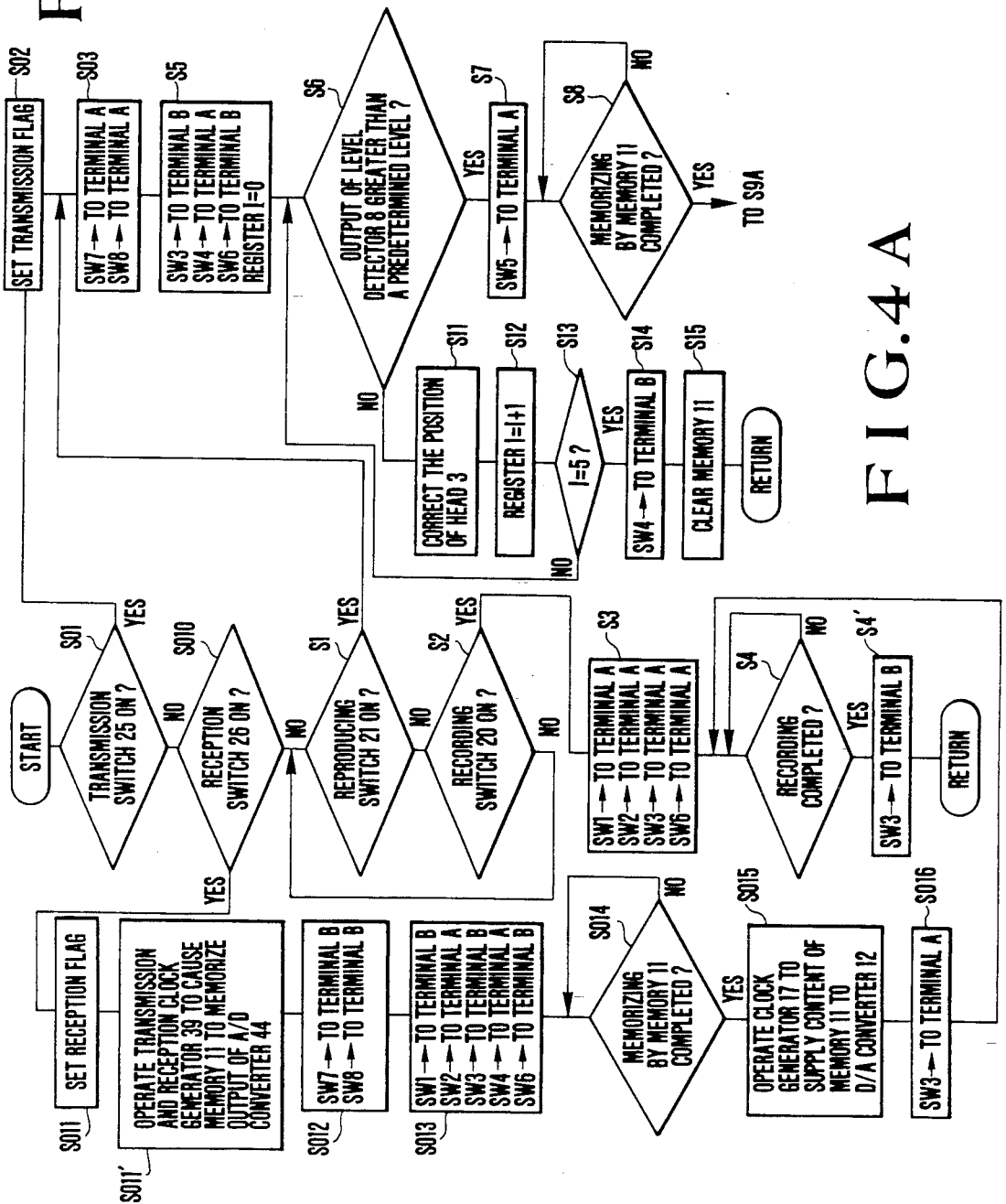

RECORDING AND/OR REPRODUCING APPARATUS HAVING, IN ADDITION TO A RECORDING MEDIUM, MEMORY MEANS FOR MEMORIZING INFORMATION REPRODUCED FROM THE RECORDING MEDIUM

This is a continuation application of Ser. No. 07/309,948, filed Feb. 9, 1989, which is a continuation of Ser. No. 06/840,886, filed Mar. 18, 1986 both abandoned.

BACKGROUND OF THE INVENTION

1. Field of the Invention

This invention relates to apparatus for recording and/or reproducing informations onto or from a recording medium.

2. Description of the Prior Art

In the field of apparatus for recording and/or reproducing informations on or from a recording medium, it has been known to use a magnetic sheet as the recording medium for video signals. In this kind of apparatus, it has been customary that when monitoring the reproduced video signal, the magnetic sheet must be concurrently rotated always in cooperation with the magnetic head to read the recorded video signal on the magnetic sheet. Because of this, there was a drawback that as the reproduction of the video signal in one and the same track on the magnetic sheet is recycled for a long time, the magnetic sheet is worn out unevenly in portions of the area as if it were scratched. Also since the magnetic head is prematurely abraded, the fluctuation of the recording and reproducing characteristics of the magnetic head is intensified.

SUMMARY OF THE INVENTION

A first object of the invention is to provide a recording and/or reproduction apparatus which has overcome such conventional drawbacks.

A second object is to provide the recording and/or reproduction apparatus with a memory capable of storing a video signal for at least one picture (field or frame) of the recorded track on the recording medium, thereby the quality of the picture and the fidelity and safety of the apparatus are improved.

Under such a second object, in a preferred embodiment of the invention, the apparatus for recording video signals while forming concentric circular tracks on a recording medium, and/or for reproducing or erasing the recorded video signals track by track is provided with memory means for storing the reproduced video signal in each unity of track, detecting means for determining that the video signal reproduced from the recording medium is stable, and control means responsive to the output of the detecting means for allowing the reproduced video signal to be written in the memory means.

A further object of the invention is to provide a recording and/or reproducing apparatus which, despite, the information recorded on the recording medium having been erased through user's fault, enables such erased information to be recovered for recording again.

These and other objects of the invention will become apparent from the following description of embodiments thereof.

BRIEF DESCRIPTION OF THE DRAWINGS

FIGS. 4A and 4B are flow charts of the control circuit 100' of the apparatus shown in FIG. 3.

DETAILED DESCRIPTION OF THE PREFERRED EMBODIMENTS

The present invention is next described in detail by reference to the drawings.

Figure 1:
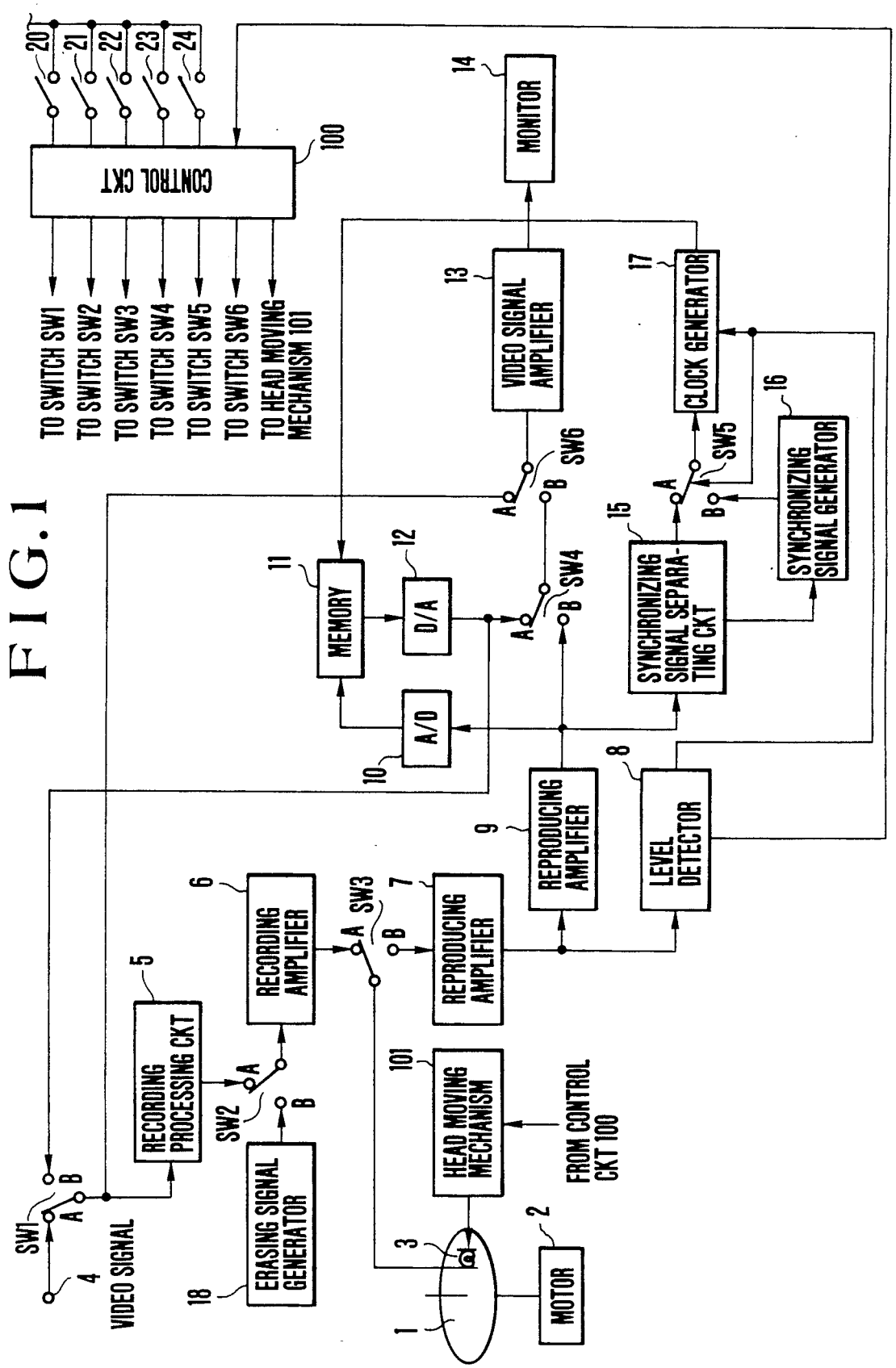
FIG. 1 is a block diagram of a first embodiment of the recording and/or reproduction apparatus according to the present invention.

In FIG. 1 there is shown one embodiment of the invention. The recording medium is here in the form of a rotatable sheet 1, such as a floppy disk, having a great number of concentric circular tracks formed therein so that video signals can be recorded, reproduced and erased track by track. While the magnetic sheet 1 is rotated by an electric motor 2 (for example, DC motor), video signals are recorded or reproduced by a magnetic head 3. These parts 1, 2 and 3 constitute recording and reproducing means. The video signal entering at a terminal 4 is processed through a recording processing circuit 5 (recording signal modulation circuit) to obtain a signal suitable for magnetic recordingre-production. The output signal of the recording processing circuit 5 is applied to a recording amplifier 6. The reproduced signal from the magnetic head 3 is applied to a reproducing amplifier 7. Detecting means in the form of a level detector 8 is provided for determining whether or not the operation of the recording-reproducing means has been stabilized by testing the level of the output signal of the reproducing amplifier 7. From the output signal of the reproducing amplifier 7, the original video signal is obtained by demodulation in passing through a reproducing processing circuit 9 (reproducing signal demodulation circuit.)

An analog-to-digital (A/D) converter 10 receptive of the analog video signal from the reproducing processing circuit 9 produces, a digital video signal. Memory means here, is provided in the form of a semiconductor memory 11, is provided for storing the digital video signal for one frame from the A/D converter 10. The digital video signal read out from the semiconductor memory 11 is converted to an analog signal again by a digital-to-analog (D/A) converter 12. A video signal amplifier 13 has an input connected selectively to the input terminal 4 and the outputs of the reproducing processing circuit 9 and D/A converter 12 by switches SW4 and SW6 and has an output which is connected to a monitor 14 (television set).

Also included are a synchronizing signal separating circuit 15 receptive of the reproduced video signal from the reproducing processing circuit 9 for producing a synchronizing signal, a synchronizing signal generator 16 cooperative with the separating circuit 15 in such a manner that in case the synchronizing signal has been separated by the circuit 15, a synchronizing signal is produced in synchronism with the separated synchronizing signal, and when it has not been separated, self-running oscillation takes place, a clock generator 17 for producing a standard signal to access the addresses of the semiconductor memory 11 in synchronism with the synchronizing signal input from the synchronizing signal separating circuit 15 or the synchronizing signal generator 16 through a switch to be described later, the clock generator 17, responsive to a trigger signal from the level detector 8, producing the clock for driving the memory 11, and an erasing signal generator 18 for producing an erasing signal by which the recorded signal on the magnetic sheet 1 can be deleted.

SW1 to SW6 are relay switches as control means for changing over the routes of the aforesaid signals. The switch SW1 selectively connects both inputs of the recording processing circuit 5 and video signal amplifier 13 to either one of the outputs of the video signal input terminal 4 and the D/A converter 12. The switch SW2 selectively connects the input of the recording amplifier 6 to either one of the outputs of the recording processing circuit 5 and erasing signal generator 18. The switch SW3 when in its A position connects the recording amplifier 6 to the magnetic head 3 and when in its B position connects the magnetic head 3 to the reproducing amplifier 7. The switch SW4 selectively connects an input B of the switch SW6 to the next stage of either one of the outputs of the D/A converter 12 and reproducing processing circuit 9. The switch SW5 selectively connects the input of the clock generator 17 to either one of the outputs of the synchronizing signal separating circuit 15 and the synchronizing signal generator 16. The switch SW6 selectively connects the input of the video signal amplifier 13 to either one of the outputs of video signal input terminal 4 and one of the D/A converter 12 and the reproducing processor circuit 9. The operations of these switches SW1 to SW6 are controlled by a control circuit 100.

Figure 2:
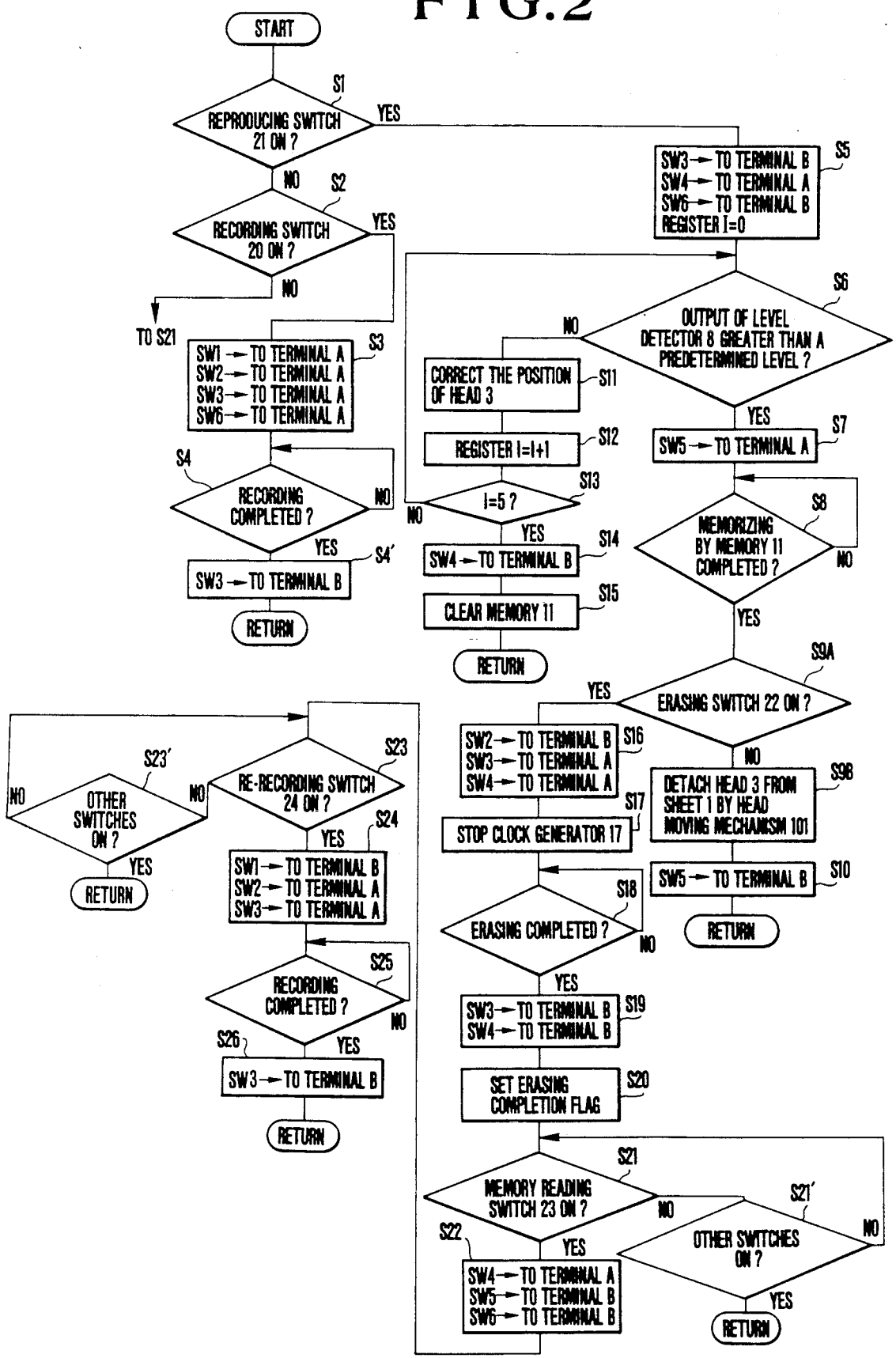
FIG. 2 is a flow chart of the control circuit 100 of the apparatus shown in FIG. 1.

The operation of the apparatus of such construction is next described by using the flow chart of the control circuit 100 shown in FIG. 2.

(A) First explanation is given to the mode of recording video signals in tracks formed on the magnetic sheet 1. For this mode, the flow branches from a step S1 to a step S2. When the operator turns on a recording switch 20, the flow then branches from the step S2 to a step S3 where the control circuit 100 sets the switches SW1, SW2, SW3 and SW6 in their A positions. Therefore, the video signal entering from the input terminal 4 is, because of the switch SW1 having its movable pole connected to its throw A, applied to the recording processing circuit 5, and, because of the switch SW6 having its pole connected to its throw A, applied to the amplifier 13, thus being displayed as a visible image on the monitor 14.

In the recording processing circuit 5, the video signal is first separated to a color-difference signal and a luminance signal which are then individually FM-modulated to obtain frequency multiplied FM signals. In more detail, the color-difference signal is changed by that modulation to an FM-modulated signal which becomes a line-sequential signal in a low region, and the luminance signal becomes a signal which is FM-modulated in a high region. The frequency multiplied FM signals from the recording processing circuit 5 are, because of the switch SW2 having its movable pole connected to its throw A, applied to the recording amplifier 6. Further, because of the switch SW3 having its movable pole connected to its throw A, the amplified FM signals from the recording amplifier 6 are applied to the magnetic head 3, while the video signal for one field is recorded by the magnetic head 3 in one track on the rotating magnetic sheet 1. Upon completion of the recording in a step S4, the switch SW3 is changed to the B position, and the flow exits from the step S4' and returns to the start.

(B) Next explanation is given to the operation of the reproduction mode of the recorded video signals on the magnetic sheet 1. When the operator turns on a reproduction switch 21, the flow branches from the step S1 to a step S5 where the switches SW3, SW4 and SW6 are set in the B, A and B positions, respectively, leaving the switches SW1 and SW2 to be idle. The other switch SW5 is rendered cooperative with the trigger signal from the level detector 8 as will be fully described later.

When in the reproduction mode, while the magnetic sheet 1 is rotated by the motor 2, the video signals recorded in the tracks on the magnetic sheet 1 are read out one track at a time by the magnetic head, and the readout signal is, because of the switch SW3 having its pole in the throw B as has been stated above, sent to the reproducing amplifier 7 therethrough. The minute video signal (reproduced signal) from the magnetic head 3 after having been amplified by the reproducing amplifier 7 is applied to the reproducing processing circuit 9 where the frequency multiplied FM signal is demodulated to obtain the color-difference signal and the luminance signal which are then combined to produce a composite video signal at the output of the circuit 9. Also, since the reproducing processing circuit 9 is included with a skew compensation circuit therein, it is when the field reproduction is performed that the skew-compensated signal by that skew compensation circuit is produced from the reproducing processing circuit 9.

The video signal produced from the reproducing processing circuit 9 is transmitted to the switch SW4 and also to the A/D converter 10 in which it is converted to a digital signal. Also, the video signal produced from the reproducing processing circuit 9 is applied to the synchronizing signal separating circuit 15, to separate off a synchronizing signal.

Also, the output signal (reproduced FM signal) from the reproducing amplifier 7 is applied to the level detector 8. When the level detector 8 detects that the input or reproduced FM signal has a higher level than a prescribed one and is stable at the level (step S6), it produces a trigger pulse. Responsive to this trigger pulse, the switch SW5 moves its pole to the throw A (step S7). It should be noted that, as shown in FIG. 1, the output of the level detector 8 may be otherwise used to drive the switch SW5 directly without intermediary through the control circuit 100. When the above-described trigger pulse is applied to the clock generator 17 from the level detector 8, the clock generator 17 produces a standard clock in synchronism with the synchronizing signal applied through the switch SW5, in this instance, the output signal from the synchronizing signal separating circuit 15. With this standard clock as the write clock for the semiconductor memory 11, the video signal in the form of a digital signal from the A/D converter 10 is stored for one frame (step S8).

On the other hand, when the above-described trigger pulse is not produced from the level detector 8, that is, when the output signal of the reproducing amplifier 7 is either below the prescribed level, or unstable, the steps S7 and S8 are not executed, and the clock generator 17 does not produce the write clock, the reading of the reproduced video signal or the output of the A/D converter 10 in the memory 11 does not take place. So, the memory 11 is allowed to retain the information written in the preceding cycle of reproducing operation.

Also, the switch SW5 takes the A position only during the time when the video signal information is being written into the memory 11. That is, after the termination of writing into the memory 11 has been detected in a step S8, the switch S5 is moved to its B position again in a step S10. It is, therefore, during the other time than when that writing goes on that the output signal of the synchronizing signal generator 16 enters the clock generator 17. In synchronism with this output signal, a clock is produced from the clock generator 17 to read out the information in the memory 11. Meanwhile, when the above-described reproducing goes on, because of the switches SW4 and SW6 being set in the A and B positions, respectively, the content of the memory 11 after having been converted to an analog signal by the D/A converter 12 is always displayed on the monitor 14. In other words, so long as no new video signal information is written in the memory 11, the video signal stored in the memory 11 is not altered. Therefore, the display content presented as the reproduced video signal on the monitor 14 also does not change.

In such a manner, when in the reproduction mode, if the track that the magnetic head 3 gains access to has the recorded video signal, the switch SW5 is caused to be connected in the terminal A by the trigger pulse from the level detector 8, the clock generator 17 produces the synchronized signal with the output signal of the synchronizing signal separating circuit 15, and the video signal for one frame is memorized in the memory 11. As soon as such memorizing has completed, the switch SW5 changes over to the terminal B, thereby instead of the synchronizing signal separated by the synchronizing signal separating circuit 15, the synchronizing signal from the synchronizing signal generator 16 is applied to the clock generator 17. By the synchronized standard clock of the clock generator 17 with the synchronizing signal from the synchronizing signal generator 16, the stored content of the memory 11 is read out, and applied to the D/A converter 12. The video signal converted to the analog signal by the D/A converter 12 is displayed on the monitor 14. It is also to be noted that when the video signal for one frame has been memorized in the memory 11, the head 3 is moved away from the sheet 1 by a head moving mechanism 101 in a step 9B. Even when the output of the reproducing processing circuit 9 is not obtained as the head 3 was moved away by executing the step S9B, and, therefore, the synchronizing signal is not separated from the synchronizing signal separating circuit 15, the clock generator 17 produces the clock signal for reading out the memorized content of the memory 11 in response to the synchronizing signal obtained from the synchronizing signal generator 16. It is also to be noted that the time necessary for the memory 11 to memorize the video signal (for one frame), that is, the time necessary to execute the step S8, is about 1/30 sec. Though the content of the memory 11 cannot be read out and monitored during this time, this writing time of 1/30 sec. has little problem in actual practice, because the newly memorized video signal in the memory 11 is immediately read out and displayed on the monitor 14. Also, because an arrangement is employed that the output signal of the synchronizing signal separating circuit 15 is applied to the synchronizing signal generator 16 to achieve phase synchronization between the synchronizing signal produced from the synchronizing signal generator 16 and the output signal from the synchronizing signal separating circuit 15, as, for example, the switch SW4 may be otherwise arranged to be manually operable to select either one of two modes in which the video signal reproduced from the sheet 1 is given to the monitor 14 through the memory 11 or directly, little disturbance of synchronization will result when the display is changed over, producing no problem.

(C) Next, the operation in case when the track being reproduced of the magnetic sheet 1 has no recorded video signal is described. Either in the aforesaid case when no video signal was recorded in that track, or in a case when the access position of the head 3 does not coincide with the track, because the output signal level of the reproducing amplifier 7 is small, no trigger pulse appears at the output terminal of the level detector 8. Therefore, the flow branches from a step S6 to a step S11 so that the position of the head 3 is slightly corrected. That is, as the position accuracy of the track formed on the magnetic sheet 1 is not sufficient, even when the access position of the head 3 is slightly misaligned, that access position is finely adjusted by executing steps S11 to S13. Upon controlling the access position of the head 3 so as to ride on the track, the flow branches from the step S6 to a step S7, where the above-described (B) operation is performed. Also during such access operation, the previously written video signal in the memory 11 is displayed right on the monitor 14. But, if no video signal was recorded in the track that the head 3 gains access to, as the level detector 8 does not produce the trigger pulse in a certain time measured by executing the steps S11 to S13 from the start of reproducing the track, the switch SW4 is moved to the B position (step S14). Then the memory 11 is cleared of the memorized content (step S15). That is, the monitor 14 of that time displays the signal obtained by reproducing the not-recorded track on the magnetic sheet 1. This signal is generally noise of low level. So, because the noise is displayed on the monitor 14, the operator is informed that the track being at present reproduced is the not-recorded track.

Because such an arrangement is made that after the output level of the reproducing amplifier 7 is larger than the predetermined certain value and stabilized as detected by the level detector 8, the video signal reproduced is memorized in the memory 11, and the video signal read out from the memory 11 is displayed by the monitor, it is possible to display the video signal having little noise and almost no disturbance of synchronization on the minitor 14.

Also, when the video signal read out from the memory 11 is being displayed as the reproduced video signal on the monitor 14, there is no need to put the magnetic head 3 in contact with the magnetic sheet 1. Therefore, the magnetic head 3 and the sheet 1 may be spaced apart from each other by executing the step S9B. This is, even when the same video signal is monitored for a long time, according to this embodiment, from the reason that the head 3 and the sheet 1 are always out of contact with each other, the magnetic sheet 1 and the magnetic head 3 are hardly abraded, and also from the reason that the monitoring is performed through the memory 11, the reproduced picture on the monitor 14 is made stable.

(D) Next, a case of erasing the video signal from the magnetic sheet 1 is explained.

When it is desired to erase a video signal from the magnetic sheet 1, there is need to ascertain what video signal is desired to erase by reproducing it from the magnetic sheet 1 to the monitor 14. Hence, the operator needs first to turn on a reproducing switch 21. The steps S1 to S8 are then executed to perform the above-described reproducing operation. While the video signal is being reproduced, the operator then turns on an erasing switch 22, so that the flow branches from the step S9A to a step S16. Because the switches SW2 and SW3 are moved to the B and A positions, respectively, in response to closure of the erasing switch 22 (step S16), an erasing signal, for example, damping signal of about 2KHz, is applied from an erasing signal generator 18 to the recording amplifier 6. This erasing signal after having been amplified through the recording amplifier 6 is recorded on that track which has so far been reproduced on the magnetic sheet 1 by the magnetic head 3, thereby the video signal in the track on the magnetic sheet 1 is erased. Also, during this erasing operation, the reproduced video signal before having been erased remains stored in the memory 11. But, because the clock generator 17 is caused to stop producing the standard clock for reading out during the time when the erasing of the video signal on the magnetic sheet 1 is performed (step S17), no picture is displayed on the monitor 14. After that, when the erasing is completed (step S18), the switch SW3 is soon moved to the B position, and, at the same time the switch SW4 also is moved to its B position (step S19), thereby noise of low level is displayed on the monitor 14 as if the track of no signal were reproduced.

Also, even after the elapse of a certain time from the completion of the erasing, no trigger pulse appears at the output terminal of the level detector 8. But, since at this time the standard clock for reading out of the clock generator 17 is stopping in a step S17, the resetting of the memory 11 also is not performed. When in the erasing mode, even after the erasing, the video signal before erased remains memorized in the memory 11. Therefore, even if the video signal has been erased from the track by mistake, it can be once more displayed on the monitor 14 by reading out the content of the memory 11.

After the above-described erasing has been completed, the operator opens the erasing switch 22, thereby the switches SW4 and SW3 are moved to the B positions. As the erased track is reproduced, noise is then displayed on the monitor 14. But, at this time, the memorized content of the memory 11 can be read out and displayed on the monitor 14 by a memory reading switch 23. That is, when the operator turns on the above-described memory reading switch 23, the flow advances from a step S21 to a step S22 where the switch SW5 is moved to the B position, the switch SW4 is moved to the A position, and the switch SW6 is moved to the B position. Thus, the video signal before erased can be monitored by the monitor 14. If the operator notices here that the erased video signal is different from what he intended to erase, he may then operate a re-recording switch 24, causing the flow to transfer from a step S23 to a step S24 where the switch SW1 is moved to the B position, the switch SW2 is moved to the A position, and the switch SW3 is moved to the A position. Thus, for the same track as was erased, a re-cording operation is performed again by the magnetic head 3. This implies that the same video signal as was erased can be regained from the memory 11 and the read out signal from the memory 11 can be recorded again. For this reason, in this embodiment, even if faulty erasing has been carried out, the erased video signal is not lost. Further, by using the above-described re-recording capability, the video signal recorded in a certain track can be transferred to another track. That is, it is needless to say that the change of the track to record can be easily performed.

It is to be noted that, if the other switches are turned on in steps S21' and S23', the flow returns to the start. Furthermore, when the recording has been completed in a step S25, the switch SW3 is changed to the B position in a step S26, and the flow returns to the start.

Figure 3:
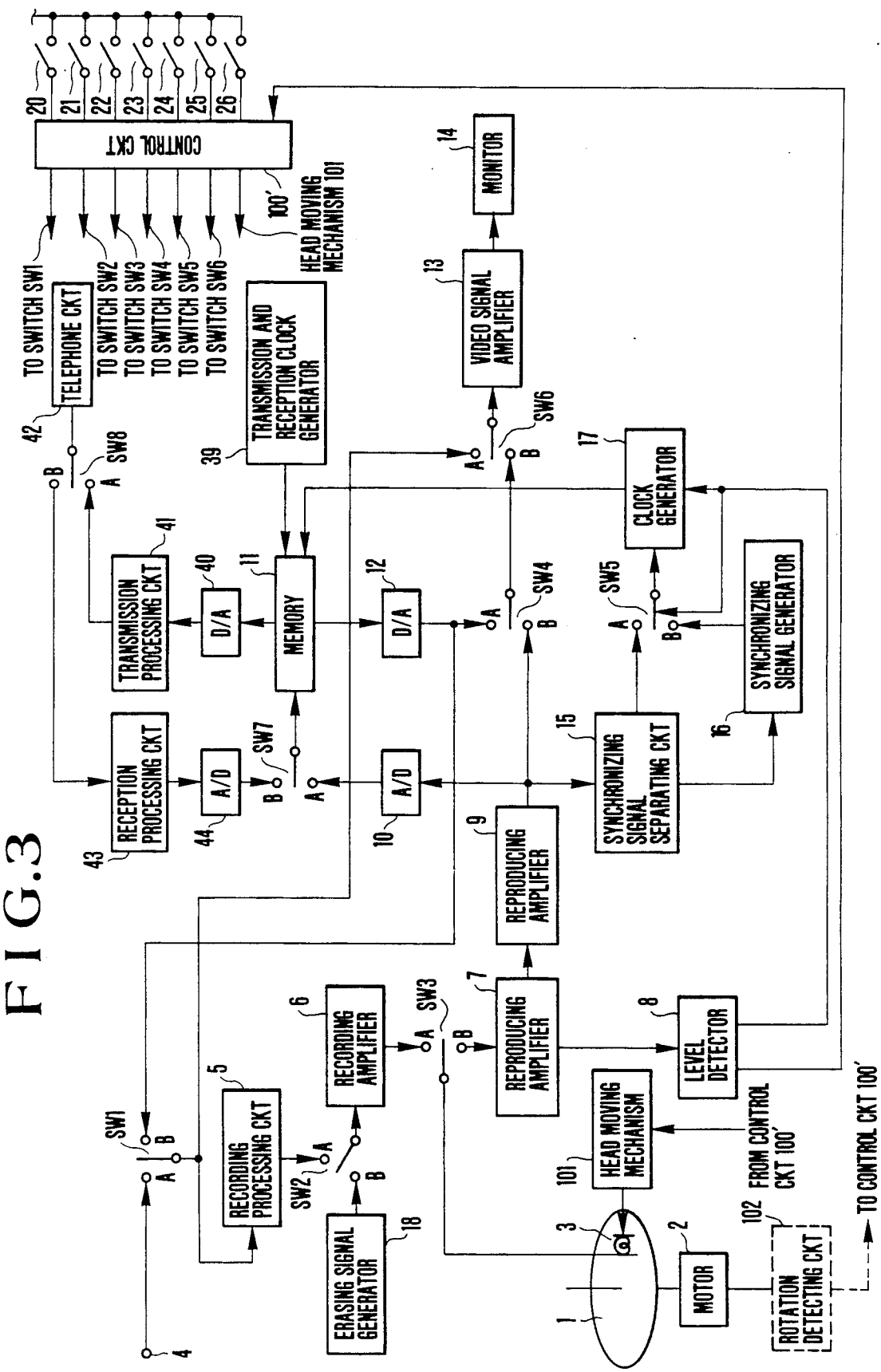
FIG. 3 is a block diagram of a second embodiment of a recording and/or reproduction apparatus having a telegraphic function according to the present invention.

Next, referring to FIG. 3, another embodiment of the invention is described. It should be noted that what is denoted, by the same reference character as that in FIG. 1 is assumed to have the same function.

In FIG. 3, 25 is a transmission switch for transmitting video signals; 26 is receiving switch for receiving transmitted video signals; 39 is a transmission-reception clock generator for producing a standard clock for driving the memory 11 when the video signals are transmitted and received by utilizing the telephone circuit 42; 40 is a D/A converter for converting the digital video signal read out from the memory 11 to an analog signal; 41 is a transmission processing circuit for performing transmission processing of the digital-to-analog converted video signal by the D/A converter 40 to transmit by utilizing the telephone circuit 42; 43 is a reception processing circuit for receiving and demodulating the signal transmitted from the telephone circuit 42; 44 is an A/D converter for converting the analog video signal demodulated by the reception processing circuit 43 to a digital signal; SW7 is a switch for changing over the input of the video signal to the memory 11 in such a way that when the video signal from the magnetic sheet 1 is memorized in the memory 11, it is connected to the terminal A, and when the video signal from the telephone circuit 42 is memorized in the memory 11, it is connected to the terminal B; SW8 is a switch for changing over between transmitter and receiver for the telephone circuit 42, when in transmission, it is moved to the terminal A, and when in reception, it is connected to the terminal B.

Figure 4B:
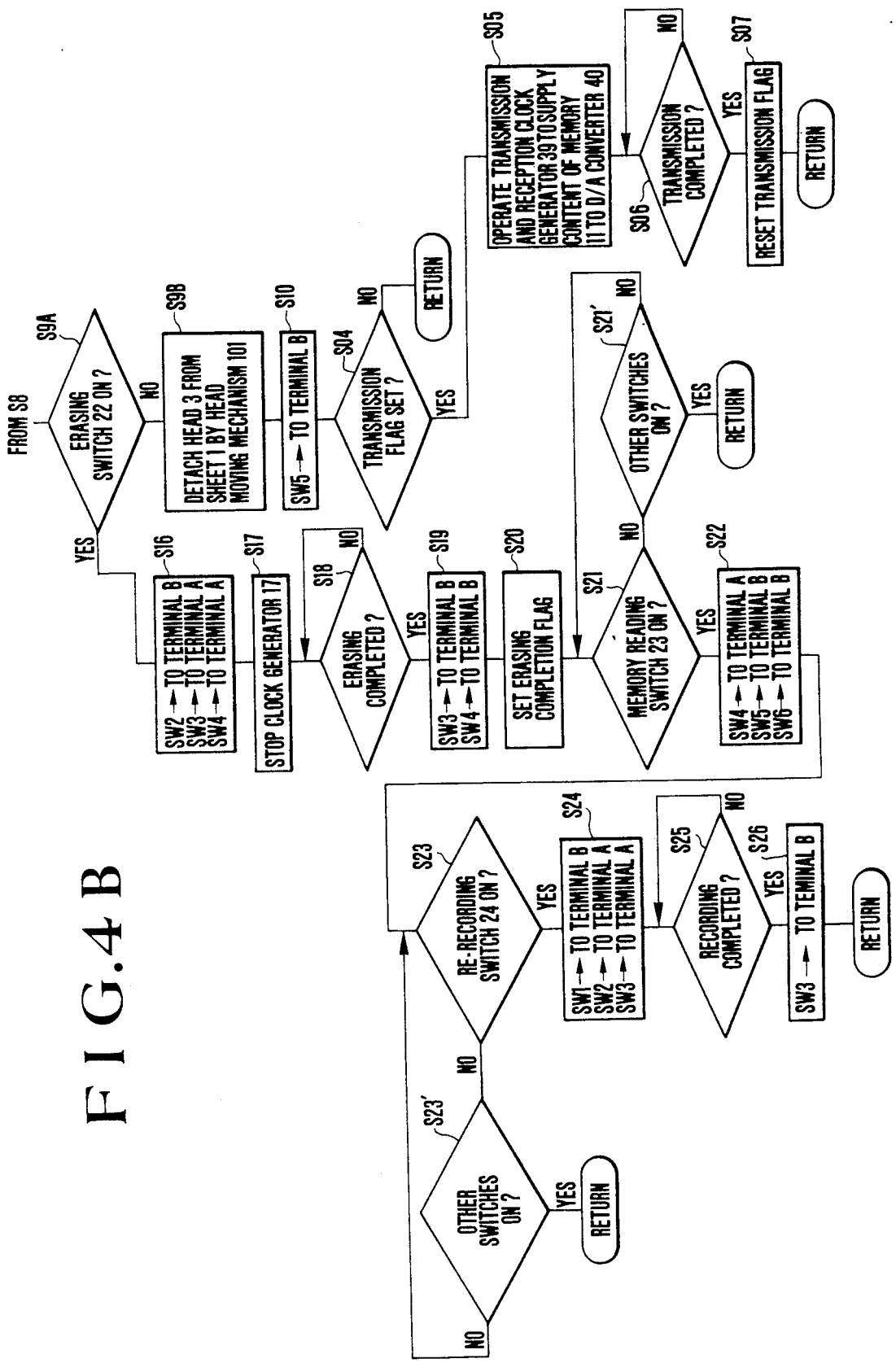

Also, FIG. 4 is a flow chart explaining the manner in which the control circuit 100' shown in FIG. 3 operates.

(E) Next, in the construction above, when the video signal is transmitted by utilizing the telephone circuit 42, the operation is performed as follows: When the transmitting switch 25 is turned on, the flow branches from a step S01 to a step S02, thereby the transmission flag is set (step S02). Then, the switch SW8 is set in the A position and the switch SW7 is set in the A position (step S03). The other switches SW3 to SW6 are controlled and the video signal is written in the memory 11 in a similar manner to that described in connection with the reproduction mode. The video signal information usable at the time of transmission is that memorized in the memory 11. So, when the steps S5 to S10 have been executed, or the writing of the video signal in the memory 11 has been completed, but when the erasing switch 22 is not ON, the transmission flag is set, causing the flow to advance from a step S04 to a step S05. The information in the memory 11 is then read out by the standard clock produced from the transmission-reception clock generator 39, then AM or FM modulated by the transmission processing circuit 41, and then sent through the switch SW8 to the telephone circuit 42. At this time, because the bandwidth of the video information read out from, the memory 11 is usually 4.2MHz, while the bandwidth of the public telephone circuit is about 3KHz, the time base must be transformed. For this purpose, the frequency of the standard clock from the transmission-reception clock generator 39 is made sufficiently lower than that of the clock from the clock generator 17 so that the video signal in the memory 11 is read out slowly by the standard clock from the generator 39.

(F) Further, the operation of receiving the transmitted video signal from the telephone circuit 42 is explained below.

When the receiving switch 26 is turned on, the flow branches from a step S010 to a step S011, thereby the receiving flag is set. The switches SW7 and SW8 are then set in their B positions (step S012). The other switches SW1 to SW3 are operated as indicated by a step S013. In the receiving mode, therefore, because the switch SW8 is set in the B position, the video signal transmitted from the telephone circuit 42, because of its having been AM or FM modulated and transformed in the time base, is demodulated by the reception processing circuit 43, then converted to a digital signal by the A/D converter 44, and then written in the memory 11 by the standard clock produced from the transmission-reception clock generator 39. In such a manner, according to the embodiment of the invention, the memory 11 is used as a buffer for transforming the time base of the video signal, thereby it being made possible to utilize the telephone circuit 42 in transmitting and receiving the video signal.

Also, when the writing of the video signal in the memory 11 has been completed, the flow branches from a step S014 to a step S015 where the video signal written in the memory 11 is read out to the D/A converter 12. When the switch SW3 is changed to the A position in a step S016, the video signal is recorded on the magnetic sheet 1. Also, meanwhile, in the step S013, the switch SW4 is set in the A position, and the switch SW6 is set in the B position, so that the output of the D/A converter 12 is supplied through the switches SW4 and SW6 to the monitor 14. Therefore, the video signal written in the memory 11 can be seen on the monitor 14. Also, in the step S016, because the switch SW3 is changed over to the A position, when the memorizing to the memory 11 has been completed, the recording on the sheet 1 can soon be carried out.

Also, the time necessary to transmit or receive the video signal of one frame memorized in the memory 11 is several minutes. During this time, it is not permitted to rewrite the content of the memory 11. That is, when the memory 11 is used for transmission or reception, the reproduced video signal from the magnetic sheet 1 cannot be written in the memory 11. At this time, however, it is possible to cause the monitor 14 to display another different video signal from that being transmitted or received by changing over the switches SW3, SW4 and SW6 to their B positions. Therefore, even though it takes several minutes to transmit or receive the video signal through the telephone circuit 42, as the next video signal to be transmitted is viewed by the monitor 14 during that time, there is an advantage that the time can be used effectively.

Even when the video signal is being received, this receiving information can be displayed by the monitor 14. So what picture is sent from the telephone circuit 42 can be ascertained by the monitor 14.

Thus, according to the embodiment of the invention, it is through the memory 11 for memorizing a prescribed quantity (for example, one track or one frame or more) of video information, that the recording, reproducing, erasing, or transmitting-receiving of the recorded information can be made to perform, thereby giving the following advantages.

(1) After the reproduced signal has been stabilized, it is taken in the memory 11. After this, as the content of the memory 11 is monitored, the wearing of the magnetic sheet and the recording head 3 can be reduced.

(2) When in the erasing mode, since the reproduced video signal is stored in the memory 11, even if faulty erasing is carried out, that video signal is not lost and can be recovered again.

(3) The use of a switch for selectively placing the video signal from the memory 11 and the video signal from the magnetic head 3 onto an output line thereof enables, the reproduced signal to be monitored for a period of about several minutes during which the memory 11 cannot be rewritten as the video signal is transmitted or received through the telephone circuit. Particularly, when it is desired to transmit two or more video signals in sequence, therefore, the operator can examine what video signal should next be transmitted.

(4) Even when the magnetic sheet is shifted from track to track while the reproducing is being performed, as it is possible to memorize only the video signal of higher image quality than a prescribed level, almost no noise is produced, and the synchronizing is hardly disturbed so that the reproducing can be stably performed.

It should be noted that in the foregoing embodiment, the recording medium and the recording head is not necessarily of the magnetic type, as a matter of course. Also, instead of rotating the recording medium, it is also possible to rotate the head.

As the memory means, use may be made of not only the semiconductor memory, but also another memory of small size with good response characteristic, for example, a magnetic bubble memory.

Also as the detecting means, a detecting circuit 102 may be provided as shown by dashed lines in FIG. 3 for detecting whether or not the speed of rotation or the phase of rotation of the motor in the recording-reproducing means has been stabilized, so that only when the speed and phase of rotation are stabilized as detected by the detecting circuit 102, the writing of the memory 11 is started. Also, in case when there is an access means for gaining access of the head to each of the tracks of the recording medium, the detecting means may be otherwise arranged to detect when the access operation terminates as in the foregoing embodiment.

Also, the detecting means may otherwise be constructed that when all these conditions of the speed and phase of rotation and the termination of the access operation are stabilized, the trigger signal is formed.

As has been described above, according to the present invention, a recording and/or reproduction apparatus which does not rely on the rising feature of the recording-reproduction means and hardly deteriorates the characteristics of the recording medium and the recording head.

Also, a recording and/or reproduction apparatus which enables the erasing, transmission or reception to be carried out with safety and fidelity.

What is claimed is:

1. A reproduce apparatus comprising:
   (a) means for reproducing information recorded at an access position of a recording medium;

(b) means for memorizing an information reproduced by said reproducing means;
(c) means for discriminating whether said access position is recorded on or not; and
(d) means for causing said memorizing means to clear memorized information when said discriminating means discriminates that the access position of said reproducing means is not recorded.

2. The apparatus according to claim 1, further comprising:
(e) manually ordering means for ordering said memorizing means to perform a memorizing operation.

3. The apparatus according to claim 2, wherein said causing means causes said memorizing means to perform memorizing in response to said manually ordering means.

4. The apparatus according to claim 1, further comprising:
controlling means for controlling said memorizing means, said controlling means causing said memorizing means to memorize information reproduced by said reproducing means when said access position is recorded on as discriminated by said discriminating means.

5. The apparatus according to claim 1, further comprising:
(e) means for displaying said information memorized by said memorizing means.

6. An apparatus according to claim 1, wherein said memorizing means is a digital memory.

7. An apparatus according to claim 1, wherein said discriminating means is arranged so as to discriminate whether said access position is recorded or not by discriminating whether or not an output level of said reproducing means is higher than a predetermined level.

8. An apparatus according to claim 1, wherein said recording medium is a disc-like medium.

9. An apparatus according to claim 1, wherein said memorizing means has a capacity to memorize an image of one picture plane.

* * * * *